Feb. 7, 1933.   E. C. JULIAN   1,896,629
HOLDING CLUTCH FOR WHEELS AND THE LIKE
Filed June 2, 1932
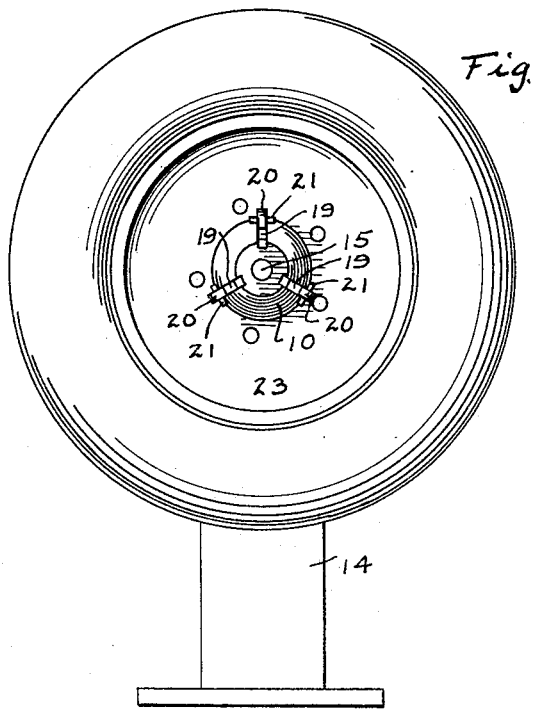
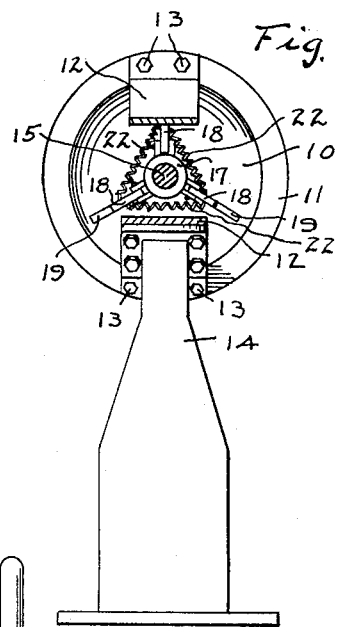
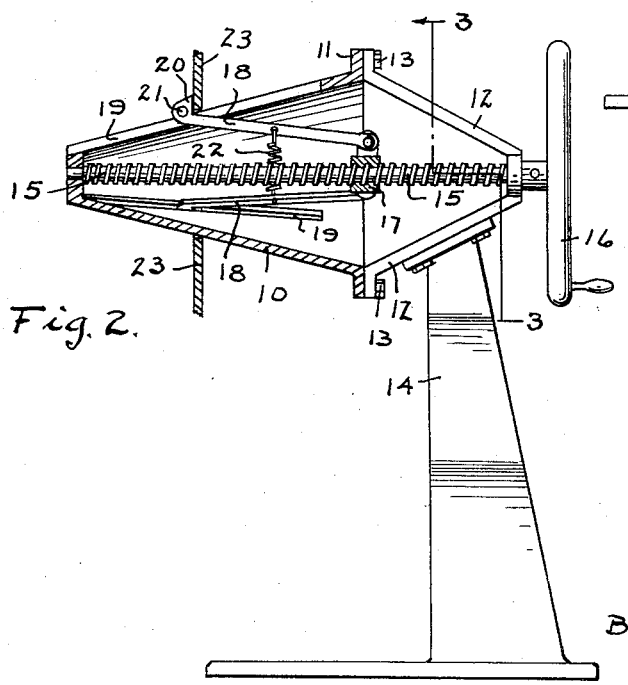
INVENTOR,
Edgar C. Julian.
By Minturn & Minturn,
Attorneys.

Patented Feb. 7, 1933

1,896,629

UNITED STATES PATENT OFFICE

EDGAR C. JULIAN, OF ELWOOD, INDIANA

HOLDING CLUTCH FOR WHEELS AND THE LIKE

Application filed June 2, 1932. Serial No. 614,908.

This invention relates to the art of clutches and particularly to a mechanism for use in centering and rigidly engaging some article having a central hole therethrough. The invention is herein described as being employed to hold an automobile wheel while the tire is being mounted or dismounted.

A promary object of the invention is to provide a simple mechanism which will support and rigidly engage an object to hold it against rotation so that in the case of the holding of automobile wheels of either the wire or disk type which are now made to be demountable, the wheel will not become scarred or damaged while tires are removed and replaced thereon. A further object of the invention is to provide a means which will receive and retain objects thereon having a wide range in the sizes of the central hole. An important advantage of the invention is that the device may be operated by a single revoluble member both in the engaging and releasing operation.

These and other objects and advantages will become apparent to those versed in the art from the following description of the invention as illustrated in one particular form in the accompanying drawing in which Fig. 1 is a front elevation of a device embodying my invention with an automobile wheel mounted thereon;

Fig. 2, a fragmentary side elevation, and

Fig. 3, a vertical transverse section on the line 3—3 in Fig. 2.

Like characters of reference indicate like parts throughout the several views in the drawing.

I form a hollow conical mandrel 10 with an out-turned flange 11 around the base thereof against which flange the feet of a V-shaped bracket 12 are attached by means of cap screws 13. Some supporting means such as the standard 14 engages the under leg of the bracket 12 so as to support the mandrel 10 to have its axis horizontally disposed. A screw-threaded shaft 15 has its front end revolubly carried in the front end or nose of the mandrel 10 and its rear end revolubly extended through the central portion of the bracket 12 whereby the shaft is maintained on the axis of the mandrel. A hand wheel 16 is fixed on the outer back end of the shaft 15 so that the shaft may be revolved upon the turning of the wheel.

A nut 17 is carried on the shaft 15 and a number of arms 18, here shown as three in number, have their rear ends rockably attached to the nut 17 between ears projecting from the nut. These arms 18 are carried forwardly from the nut 17 to have their forward ends extend within longitudinal slots 19 cut through the wall of the mandrel 10, one slot being provided for each of the arms. The outer end of each of the arms 18 is provided with a jaw 20 through which is passed a pin 21 to bear against the outer side of the mandrel as a means of maintaining the jaws in a position to project outwardly through the slot to beyond the outer side of the mandrel. The three arms 18 are tied one to the other with springs 22 so that the pins 21 are yieldingly held against the mandrel.

By revolving the wheel 16 so as to turn the shaft 15, the nut 17 may be advanced along the shaft in either direction depending upon the direction of rotation of the wheel, the three arms holding the nut against rotation. In using the device, the nut 17 is advanced toward the front end of the mandrel 10 so as to carry the jaws 20 toward the front of the mandrel so as to permit the jaws to approach toward the axis of the shaft 15 as the pins 21 slide down the mandrel under the pull of the springs 22 in conjunction with the forward movement of the arms 18. The object to be supported on the mandrel, here shown as the wheel 23 is brought up to have the mandrel extend through the central hole thereof and the wheel 16 is then revolved to shift the nut 17 rearwardly so as to pull the arms 18 backwardly and carry the jaws 20 against the front face of the wheel immediately adjacent the mandrel. The pins 21 prevent the jaws from dropping down through the slots when they contact with the wheel and continued rearward travel of the nut 17 carries the jaws back to force the wheel firmly against the tapered mandrel. The wheel may be gripped in this manner such that it can neither be rotated about the mandrel nor tipped forwardly or rearwardly. All parts of the wheel are free of contact with any supporting member with the exception of that edge bearing against the mandrel and the portion about the forward face of the wheel immediately adjacent the periphery of the central hole. After the desired work has been accomplished on the wheel, the hand wheel 16 may be turned in the reverse direction so as to shift the nut 17 forwardly and allow the jaws 20 to travel down the tapered wall of the mandrel so as to come within the circumference of a circle less than that of the opening through the wheel whereupon the wheel may be lifted off of the mandrel.

While I have herein shown and described my invention in the one best form now known to me it is obvious that structural changes may be made without departing from the spirit of the invention and I therefore do not desire to be limited to that precise form beyond the limitations imposed by the following claims.

I claim:

1. In a retaining device, a hollow tapered mandrel having longitudinal slots, a plurality of jaws extending from the inside of the mandrel through the slots in the mandrel, and means acting on the inner ends of the jaws for advancing and retracting the jaws longitudinally of the mandrel.

2. In a retaining device, a hollow tapered mandrel having longitudinal slots, a plurality of jaws extending from the inside of the mandrel through the slots in the mandrel, and means acting on the inner ends of the jaws for advancing and retracting the jaws longitudinally of the mandrel, and means retaining the jaws to extend a constant distance from the mandrel at all positions therealong.

3. In a retaining device, a hollow conical mandrel, a central screw-threaded shaft revolubly carried axially of the mandrel, a nut carried by the shaft, a plurality of arms rockably attached to the nut, each of said arms being carried forwardly from the nut to extend into longitudinal slots out through the mandrel, jaws on the arms extending through the slots, and means maintaining the jaws in extended positions.

4. In a retaining device, a hollow conical mandrel, a central screw-threaded shaft revolubly carried axially of the mandrel, a nut carried by the shaft, a plurality of arms rockably attached to the nut, each of said arms being carried forwardly from the nut to extend into longitudinal slots out through the mandrel, jaws on the arms extending through the slots, and means maintaining the jaws in extended positions, said means comprising members carried by the arms to overhang the slots from the outside of the mandrel.

5. In a retaining device, a hollow conical mandrel, a central screw-threaded shaft revolubly carried axially of the mandrel, a nut carried by the shaft, a plurality of arms rockably attached to the nut, each of said arms being carried forwardly from the nut to extend into longitudinal slots out through the mandrel, jaws on the arms extending through the slots, and means maintaining the jaws in extended positions, said means comprising members carried by the arms to overhang the slots from the outside of the mandrel, and spring means yieldingly pulling said arms toward the axis of said shaft.

In testimony whereof I affix my signature.

EDGAR C. JULIAN.